United States Patent
Shanken et al.

(10) Patent No.: US 10,366,085 B2
(45) Date of Patent: Jul. 30, 2019

(54) SYSTEM, METHOD, AND COMPUTER PROGRAM FOR AUDIT SCORING

(71) Applicant: Lead Intelligence, Inc., Gwynedd Valley, PA (US)

(72) Inventors: Ross Shanken, Gwynedd Valley, PA (US); Emanuel I Wald, Laverock, PA (US); Atul Patel, Irvine, CA (US)

(*) Notice: Subject to any disclaimer, the term of this patent is extended or adjusted under 35 U.S.C. 154(b) by 1009 days.

(21) Appl. No.: 13/761,578

(22) Filed: Feb. 7, 2013

(65) Prior Publication Data

US 2013/0151557 A1 Jun. 13, 2013

Related U.S. Application Data

(63) Continuation-in-part of application No. 13/400,872, filed on Feb. 21, 2012, now Pat. No. 8,498,976, and a continuation-in-part of application No. 13/111,940, filed on May 19, 2011, now Pat. No. 9,495,659.

(51) Int. Cl.
*G06F 16/2455* (2019.01)
*G06Q 30/06* (2012.01)

(52) U.S. Cl.
CPC ......... *G06F 16/2455* (2019.01); *G06Q 30/06* (2013.01)

(58) Field of Classification Search
CPC ........ G06Q 30/02; G06Q 40/06; G06Q 10/10; G06Q 30/0282; G06Q 20/085; G06Q 30/0225; G06Q 30/0275; G06F 14/28; G06F 11/008; G06F 17/5009; G06F 21/10; G06F 17/30772; G06F 2216/03; G06F 17/30775
See application file for complete search history.

(56) References Cited

U.S. PATENT DOCUMENTS

| | | | |
|---|---|---|---|
| 6,826,594 B1 | 11/2004 | Pettersen | |
| 7,577,587 B2 | 8/2009 | Gee | |
| 7,827,057 B1 | 11/2010 | Walker et al. | |
| 8,065,264 B1 * | 11/2011 | Achanta | G06F 17/30442 707/602 |
| 8,103,546 B1 | 1/2012 | Des et al. | |
| 8,229,819 B2 | 7/2012 | Ransom et al. | |
| 8,505,106 B1 | 8/2013 | Bhosle et al. | |
| 8,595,058 B2 | 11/2013 | Fordyce, III et al. | |
| 8,849,746 B2 | 9/2014 | Candea et al. | |
| 8,983,855 B1 * | 3/2015 | Bombalier | G06Q 50/22 705/2 |
| 2002/0010784 A1 | 1/2002 | Clayton et al. | |
| 2002/0065772 A1 | 5/2002 | Saliba et al. | |
| 2002/0107776 A1 | 8/2002 | Bove et al. | |

(Continued)

OTHER PUBLICATIONS

"Final Office Action" issued by USPTO dated Oct. 15, 2013, for U.S. Appl. No. 13/111,940.

(Continued)

*Primary Examiner* — Johann Y Choo
(74) *Attorney, Agent, or Firm* — LeonardPatel PC; Sheetal S Patel; Michael A Leonard

(57) ABSTRACT

An audit scoring system may include authorizing a user device to configure an audit for one or more form identification numbers. The system may receive values for each disposition associated with form data. The system may also assign values to each disposition such that a query can be performed against the audit using a form identification number associated with the form data.

14 Claims, 9 Drawing Sheets

(56) References Cited

U.S. PATENT DOCUMENTS

| | | |
|---|---|---|
| 2002/0116531 A1 | 8/2002 | Chu |
| 2003/0084294 A1 | 5/2003 | Aoshima et al. |
| 2003/0110130 A1* | 6/2003 | Pelletier ................. G06Q 30/02 705/50 |
| 2003/0145103 A1 | 7/2003 | Pruyne et al. |
| 2004/0117247 A1 | 6/2004 | Agrawal et al. |
| 2004/0195310 A1 | 10/2004 | Silverbrook et al. |
| 2004/0230494 A1 | 11/2004 | Lotvin et al. |
| 2005/0097204 A1 | 5/2005 | Horowitz et al. |
| 2005/0188007 A1 | 8/2005 | Warner et al. |
| 2005/0203809 A1 | 9/2005 | Stone et al. |
| 2005/0278289 A1 | 12/2005 | Gauweiler et al. |
| 2006/0015469 A1* | 1/2006 | Whitehouse ................. 705/410 |
| 2006/0064340 A1 | 3/2006 | Cook |
| 2006/0077444 A1 | 4/2006 | Lum et al. |
| 2006/0265495 A1 | 11/2006 | Butler et al. |
| 2007/0090185 A1 | 4/2007 | Lewkowitz et al. |
| 2007/0256124 A1 | 11/2007 | Ih et al. |
| 2007/0289002 A1 | 12/2007 | Van Der et al. |
| 2008/0059288 A1 | 3/2008 | Kokernak |
| 2008/0201204 A1 | 8/2008 | Rose et al. |
| 2008/0260267 A1 | 10/2008 | Goldberg et al. |
| 2008/0300962 A1 | 12/2008 | Cawston et al. |
| 2009/0006159 A1 | 1/2009 | Mohr et al. |
| 2009/0055443 A1 | 2/2009 | Miyamoto et al. |
| 2009/0164477 A1 | 6/2009 | Ganguly |
| 2009/0193507 A1 | 7/2009 | Ibrahim |
| 2009/0210392 A1 | 8/2009 | Agranoff et al. |
| 2009/0248492 A1 | 10/2009 | Lloyd |
| 2010/0257012 A1 | 10/2010 | Walker et al. |
| 2010/0257354 A1 | 10/2010 | Johnston et al. |
| 2011/0055021 A1 | 3/2011 | Haag |
| 2011/0213670 A1* | 9/2011 | Strutton ................. G06Q 30/02 705/14.73 |
| 2011/0231230 A1 | 9/2011 | Christon et al. |
| 2011/0231240 A1 | 9/2011 | Schoen et al. |
| 2011/0258016 A1 | 10/2011 | Barak et al. |
| 2011/0289106 A1 | 11/2011 | Rankin |
| 2012/0030054 A1 | 2/2012 | Zamani |
| 2012/0191582 A1 | 7/2012 | Rance et al. |
| 2012/0290491 A1 | 11/2012 | Rafferty et al. |

OTHER PUBLICATIONS

"Non-Final Office Action" dated Dec. 1, 2014 for U.S. Appl. No. 13/111,940.

Isaac M. Woo, "Non-Final Office Action" dated May 28, 2014 for U.S. Appl. No. 13/925,716.

"Final Office Action" dated Jun. 4, 2014 for U.S. Appl. No. 13/111,940.

"Non-Final Office Action" issued for U.S. Appl. No. 13/111,940 dated Dec. 24, 2013.

Isaac M. Woo, "Notice of Allowance" for U.S. Appl. No. 13/925,716 dated Oct. 3, 2014.

"Non-Final Office Action" dated Apr. 12, 2013 for U.S. Appl. No. 13/111,940, filed May 19, 2011.

Saac M. Woo, "Non-Final Office Action" dated May 3, 2013 for U.S. Appl. No. 13/400,872, filed Feb. 21, 2012.

"New LeadIdentity Brings Transparency and Quality into Control", LeadCritic, Mar. 24, 2008, http://blog.leadcritic.com/lead-management/lead-verification/new-leadidentity-brings-transparency-and-quality-into-control.

Isaac M. Woo, "Final Office Action" dated Aug. 19, 2014 for U.S. Appl. No. 13/925,716.

"Non-Final Office Action" dated Apr. 21, 2016 for U.S. Appl. No. 13/111,940.

"Notice of Allowance" dated Sep. 9, 2016 for U.S. Appl. No. 13/111,940.

"Final Office Action" dated May 8, 2015 for U.S. Appl. No. 13/111,940.

* cited by examiner

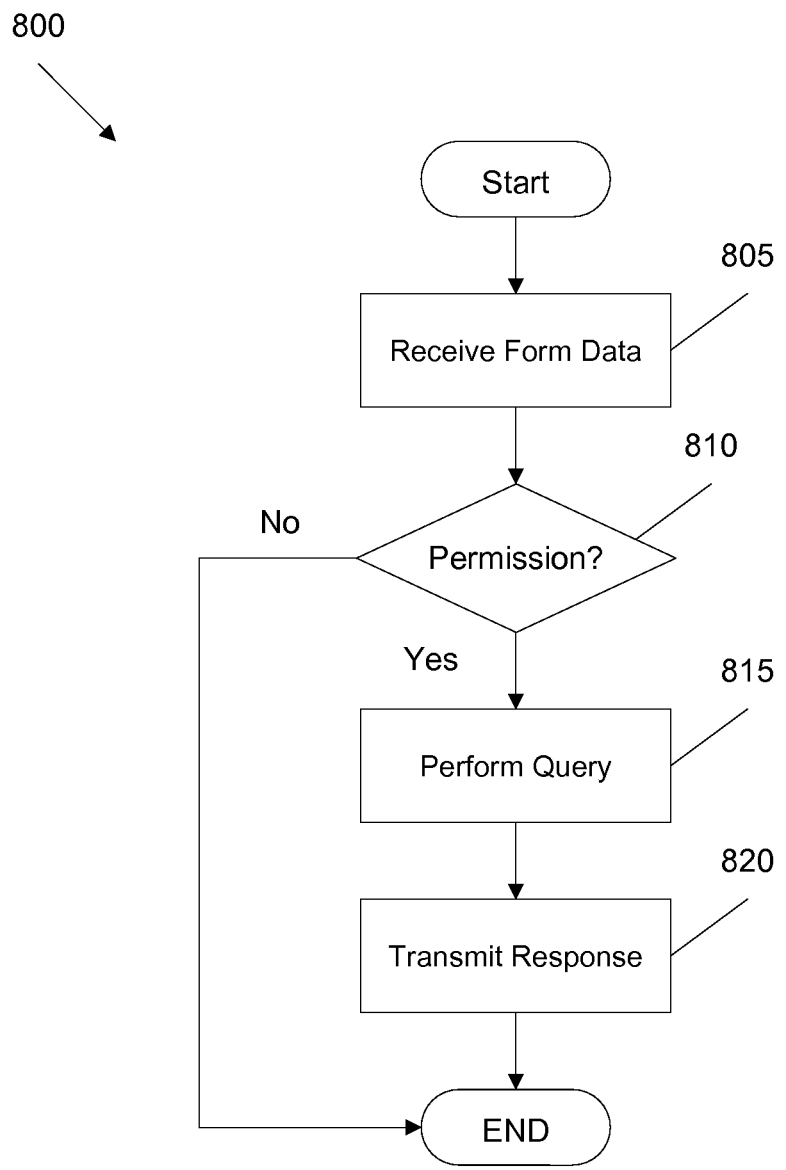

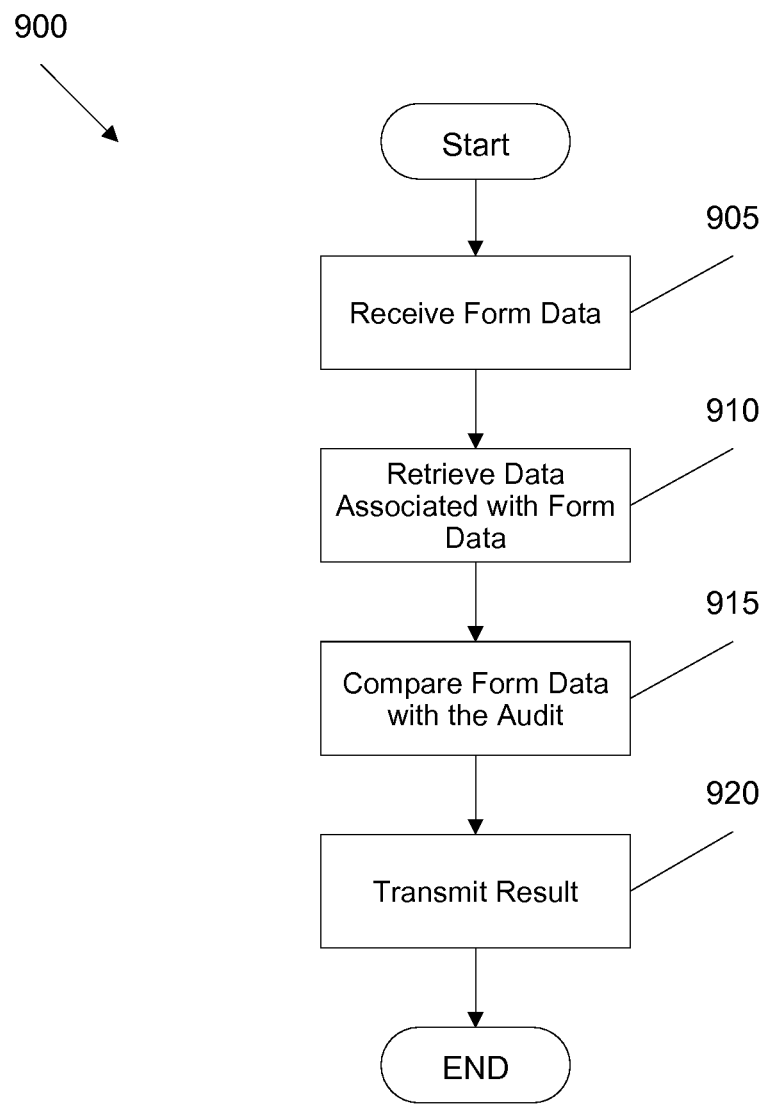

SYSTEM, METHOD, AND COMPUTER PROGRAM FOR AUDIT SCORING

CROSS-REFERENCE TO RELATED APPLICATION

This application is a continuation-in-part of, and claims the benefit of, U.S. Non-Provisional patent application Ser. Nos. 13/111,940, filed on May 19, 2011, and 13/400,872, filed on Feb. 21, 2012. The subject matter of the earlier-filed applications is hereby incorporated by reference in its entirety.

FIELD

The present invention generally relates to an audit scoring system, and more particularly, to a system, method, and a computer program that may apply flagging, scoring and/or actions to dispositions of data associated with form identification numbers (FINs).

BACKGROUND

Within several industries, parties often provide data to other parties across a network. Oftentimes, this data is sold from one party to another. Once the data is received, the receiving party (or purchaser) may perform various checks on the data, oftentimes with business rules associated with those checks.

For example, within the online lead generation space, a supplier of form data (or leads) sells data to a purchaser of the form data that was collected in some manner by the supplier of the form data. The purchaser of the form data may take any of these actions upon receiving the data: (1) reject the data attempting to be sold for various reasons; (2) determine how much the purchaser is willing to pay for the data; (3) append other data or intelligence associated with the presented data from the buyer's own databases and/or from a third party data or intelligence provider; and/or (4) expend resources differently based upon various rules, such as electing to place a phone call to an individual represented by the purchased data versus sending an email in order to optimize marketing for the optimal business result.

However, there may be numerous problems with form data being passed from a supplier to a purchaser. For example, the purchaser may reject the form data after viewing the contents of the form data and maintaining the form data in the database of the purchaser without paying for the form data. It may be beneficial to construct a flagging or scoring system that allows a potential purchaser of form data to create an audit. The audit may allow a supplier to determine whether the purchaser is interested in purchasing the form data prior to transmitting the form data to the purchaser, and allow the purchaser to determine whether the form data that was purchased is legitimate.

SUMMARY

Certain embodiments of the present invention may provide solutions to the problems and needs in the art that have not yet been fully identified, appreciated, or solved by current lead audit systems.

In accordance with an embodiment of the present invention, a computer-implemented method is provided. The method includes authorizing a user device, by a computing system, to create an audit for form data. The method also includes receiving, at the computing system, values for each disposition associated with the form data. The method further includes assigning, by the computing system, values to each disposition to allow a query to be performed against the audit using a form identification number associated with the form data.

In another embodiment of the present invention, an apparatus is provided. The apparatus includes at least one processor and memory having a computer program. The computer program, when executed by at least one processor causes the apparatus to authorize a client device to create an audit for form data, and receive values for each disposition associated with the form data. The apparatus may also assign the values to each disposition to allow a query to be performed against the audit using a form identification number associated with the form data.

In yet another embodiment of the present invention, a computer-implemented method is provided. The computer-implemented method includes receiving, at a computing device, a request to create an audit from a client device, and creating, by the computing device, an audit with a set of rules associated with each category.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8 is a flowchart illustrating a method for querying an audit created by the owner, according to an embodiment of the present invention.

FIG. 9 is a flowchart illustrating a method for performing a query against an audit, according to an embodiment of the present invention.

DETAILED DESCRIPTION OF THE EMBODIMENTS

Figure 1:
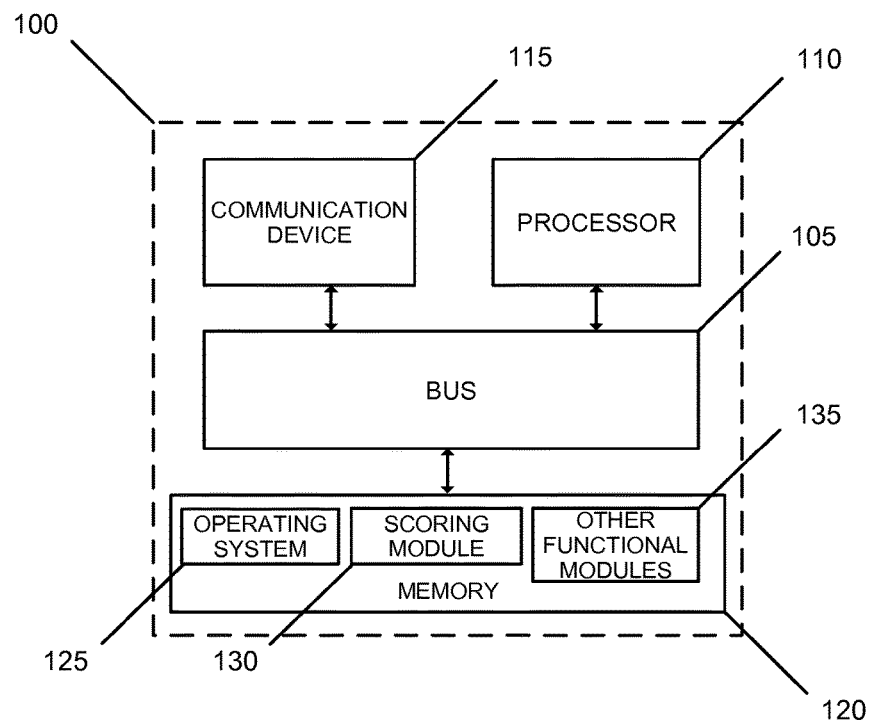
FIG. 1 illustrates a block diagram of an audit scoring system, according to an embodiment of the present invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments of the present invention provide a user device with the ability to apply flags and/or scores to form data, including a FIN, based on a disposition of data associated with the form data. This data may include, but is not limited to, form data age, form data authenticity, form data integrity, form data origin, consumer origin, form data velocity, consumer velocity, form data lineage, and form data duplication. In one embodiment, to apply flags to each disposition category, a color code, such as yellow, green, and/or red, may be used to represent three discrete categories of flags. Green may indicate that the data associated with a disposition is valid. Yellow may indicate that the data associated with the disposition requires further review, and red may indicate that the data associated with the disposition is invalid or should be rejected. However, any color scheme, number of flags, and/or indication mechanism may be used.

Certain embodiments herein, however, describe aspects of scoring the dispositions of the data associated with the form data. In one embodiment, for example, a plus, minus, or neutral (0) score may be created for each disposition of data related to the form data before a query is performed on the form data, such that when a party queries the form data and its associated data, a predetermined logic may assign a value to each aspect of the data associated with the form data that is being queried. The predetermined logic may also create an aggregate or calculated value that is derived from the categorical values. In another embodiment, a predetermined decision for different aggregate and/or calculated values may be created based on the aggregate and/or calculated value.

The following embodiments describe how the user device may set up a scoring and/or flagging system. In one embodiment, the user device may create certain acceptance or rejection criteria or decisions based upon a certain result. In another embodiment, a user may utilize different resources against the received data based upon the result. For example, a purchaser may elect to place a phone call to an individual represented by the purchased data versus sending an email in order to optimize marketing for an optimal business result. However, in another example, the purchaser may not take any action based on the result.

In yet another embodiment, a user may assign different monetary values to different results. For instance, the user may calculate how valuable certain data sets with similar characteristics are, and assign how much the user is willing to pay for data with those characteristics. Used alongside the pre-audit technology described in U.S. patent application Ser. No. 13/400,872, this feature allows for a market or exchange to emerge such that a supplier of data may pre-audit the score of a potential purchaser of that data and receive back a dollar amount that the potential purchaser may be willing to pay for the data—all without the potential purchaser of the data ever having been exposed to the data.

In certain embodiments, a user may also predetermine which actions he or she would like to take for each disposition of data associated with the form data. For example, an action associated with a green flag could be interpreted as "accept" the form data, a yellow flag could be interpreted as "review" the form data, and a red flag could be interpreted as "reject" the form data.

Common across all of the embodiments may be a third party server, as depicted in FIG. 1, that is configured to manage the flags, scores, and actions such that both parties (e.g., suppliers and purchasers) can determine what the supplier of the data is asking for in terms of routing the data or dollar amount (such as an "ask" feature). The parties can also determine what the potential recipient or purchaser of the data is willing to provide or pay for such data (like a "bid")—all without the supplier or potential purchaser being required to exchange the data with one another to achieve this result.

Such embodiments allow for a standard set of understandings across an entire industry that often exchanges data between different parties. For example, within the online lead industry, thousands of data sets (sometimes referred to as "leads") are exchanged between thousands of entities every day. The above scoring methodologies would allow potential purchasers to value a lead, in real-time, without viewing the lead, and would also allow a supplier of a lead to consider multiple offers in real-time, without divulging the lead to any of the potential purchasers.

FIG. 1 illustrates a block diagram of an audit scoring system 100, according to an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network. Various external viewing and control devices, such as monitors, keyboards, haptic interfaces, and/or cursor control devices (not shown), may also be included in system 100.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

According to one embodiment, memory 120 may store software modules that may provide functionality when executed by processor 110. The modules can include an operating system 125 and a scoring module 130, as well as other functional modules 135. Operating system 125 may provide operating system functionality for system 100. Scoring module 130 may be configured to allow a user device to set up a scoring system under each category in which a set of data associated with a FIN may be queried (e.g., audited or pre-audited). Because system 100 may be part of a larger system, system 100 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
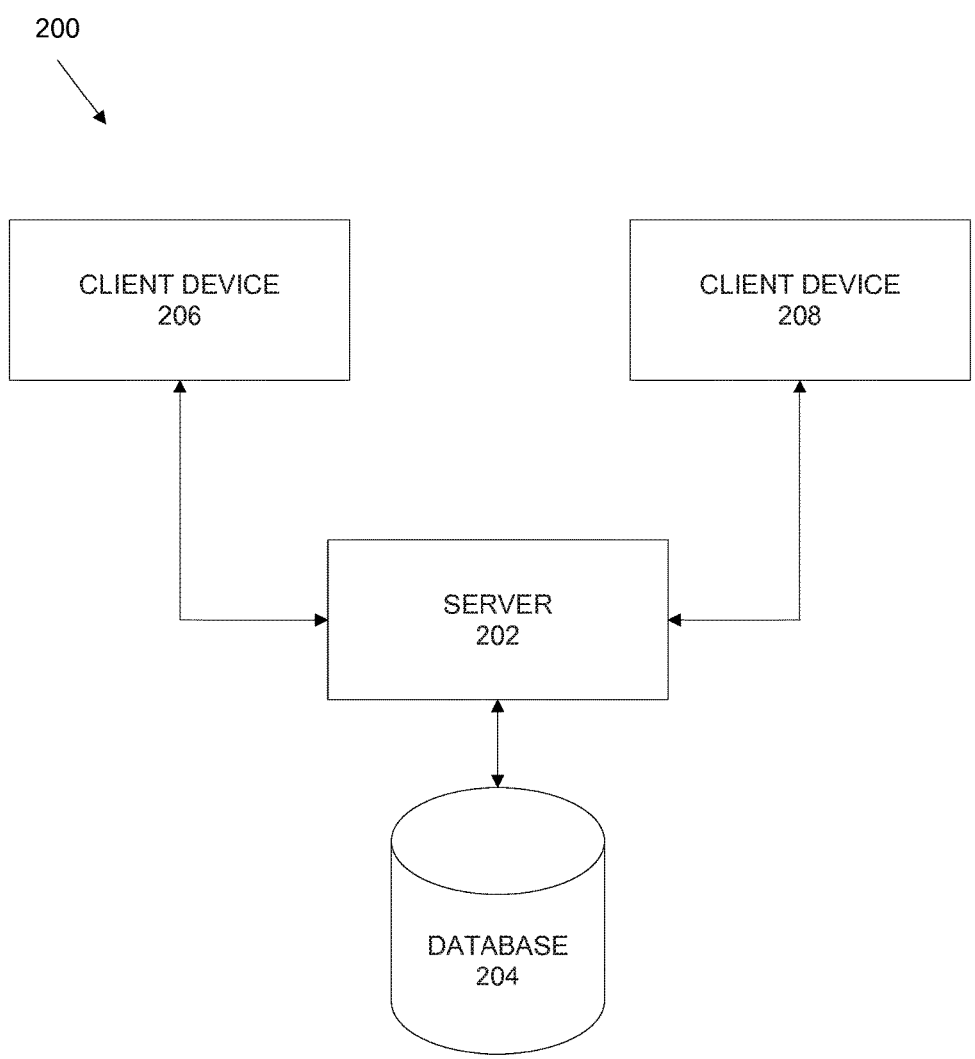
FIG. 2 illustrates a scoring system, according to an embodiment of the present invention.

FIG. 2 illustrates a scoring system 200, according to an embodiment of the present invention. Scoring system 200 includes a server 202 that may be accessed by a plurality of client (or user) devices (e.g., computing devices). For purposes of simplicity, client device 206 may be a supplier of form data and client device 208 may be a purchaser of the form data. However, it should be appreciated that client device 206, 208 can be a supplier of the form data and/or the purchaser of the form data.

Server 202 may also be operably connected to a database 204 that may store form data and a plurality of FINs to identify the form data. Database 204 may also store a plurality of audits that may be created by, for example, one or more client devices. In this embodiment, client device 208 (purchaser) may access server 202 to create an audit to allow client device 206 to query (or pre-audit) against the audit or allow client device 208 to query against his or her own audit. Details of creating an audit in some embodiments are described in FIG. 3.

Figure 3:
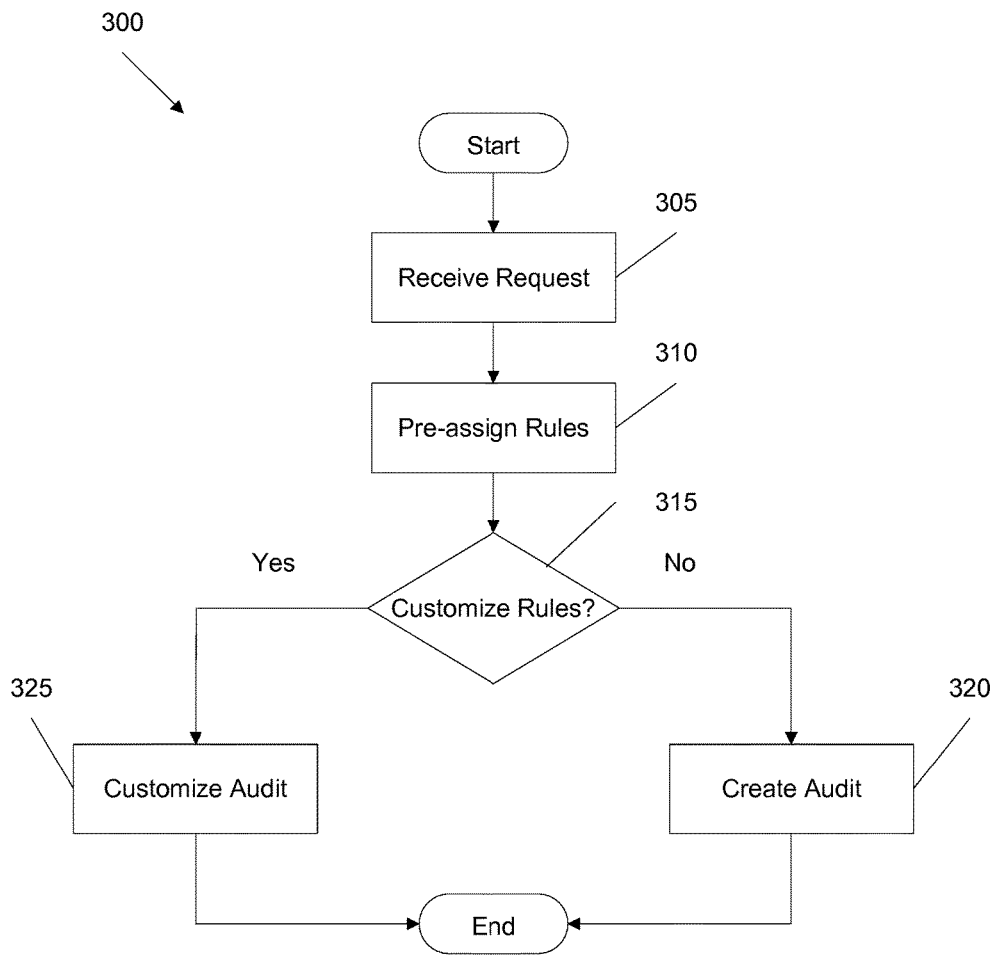
FIG. 3 is a flowchart illustrating a method for creating an audit, according to an embodiment of the present invention.

FIG. 3 is a flowchart illustrating a method 300 for creating an audit, according to an embodiment of the present invention. In some embodiments, method 300 of FIG. 3 may be implemented, for example, by computing system 100 of FIG. 1. Method 300 begins with receiving a create audit request from the purchaser at 305. At 310, the computing system creates an audit with a set of default rules pre-assigned or associated with each category. Depending on the configuration of the computing system, the rules may include flags, scores, and/or actions. It should be appreciated that an audit may be a definition of flags, scores and/or actions that can be pre-assigned by an audit owner to various dispositions across various categories of dispositions associated with a FIN.

At 315, the computing system determines whether the purchaser has requested to customize the rules associated with the audit. If the computing system determines that the purchaser has not requested to customize the audit, then the computing system creates an audit with the default rules at 320. If the computing system determines that the purchaser requested to customize the audit, then the computing system transmits a list of categories of the audit that may be customized by the purchaser at 325.

Figure 4:
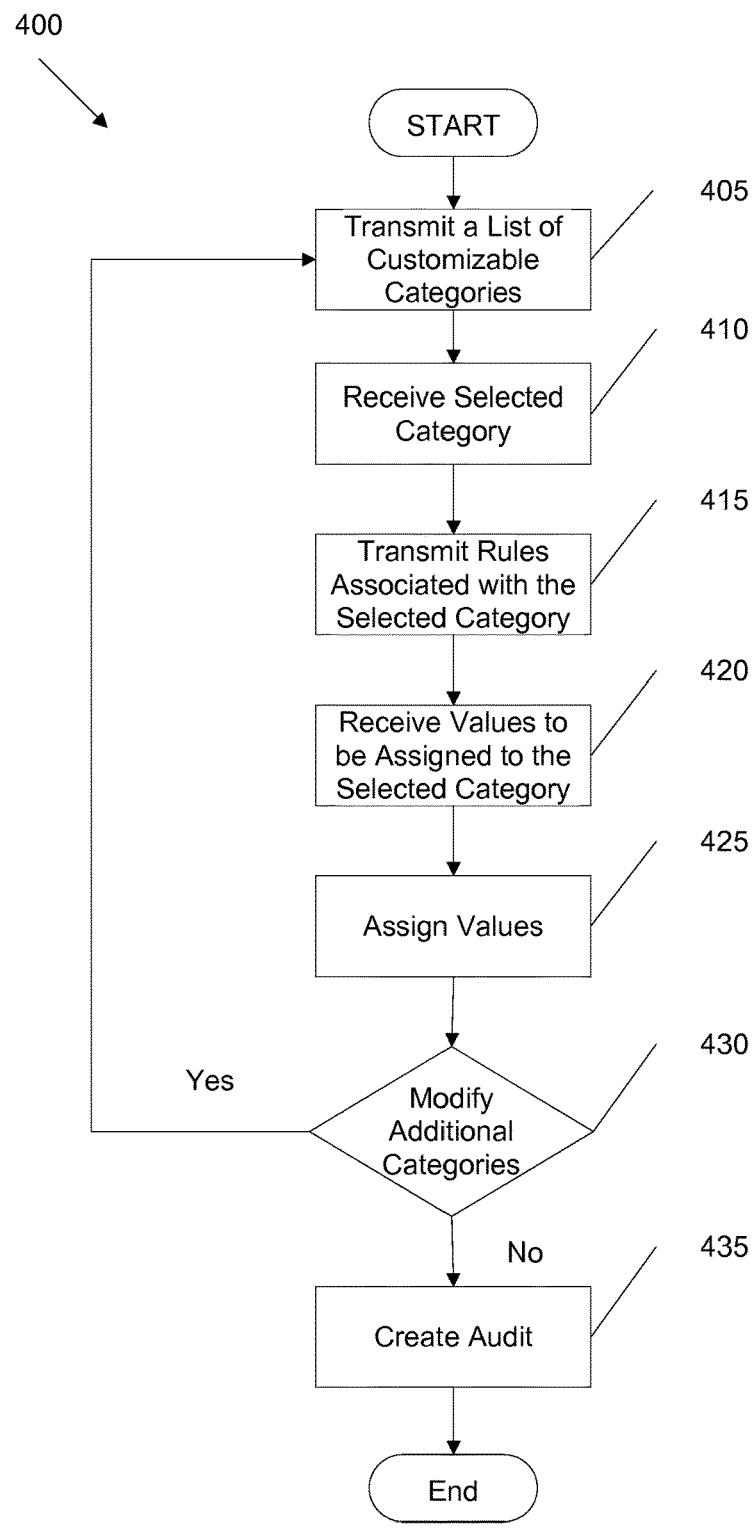
FIG. 4 is a flowchart illustrating a method for customizing an audit, according to an embodiment of the present invention.

FIG. 4 is a flowchart illustrating a method 400 for customizing an audit, according to an embodiment of the present invention. In some embodiments, method 400 of FIG. 4 may be implemented, for example, by computing system 100 of FIG. 1. The method includes transmitting at 405 a list of customizable categories to the purchaser—in this case, the owner of the audit. This allows the owner of the audit to review each of the possible disposition outcomes prior to assigning values to the possible disposition outcomes. At 410, the computing system receives a category that is selected to have its rules customized. At 415, the computing system transmits rules associated with the selected category, and receives values that are to be assigned to the selected category at 420.

At 425, the computing system assigns the values to each disposition associated within the selected category. For example, flags, scores, and/or actions may be assigned to one or more dispositions associated within the selected category. If flags are assigned, then various flag colors may be used, such as green, red, or yellow, as described above. If scores are assigned, then a numeric scoring scale may be used. For example, the owner of the audit may assign a scale from −100 to 100 depending on how the owner weighs different potential disposition results. If an action is assigned, then a desired action may be associated with each flag result, the overall flag results, and/or a composite score. In one embodiment, an action may be associated with each flag associated within each disposition. For example, a red flag within form data age might have one course of action, while a red flag within a different form data disposition category may have a different desired action.

At 430, the computing system determines whether additional categories are to be customized based on a response received from the owner of the audit. If the computing system determines that additional categories are to be customized, then the process returns to 405 and a list of categories that may be customized are transmitted to the owner of the audit. If the computing system determines that additional categories are not to be customized, then the audit is created at 435.

Once the audit has been created, the owner of the audit may reconfigure the audit at a later time. The owner of the audit may also authorize one or more suppliers of the form data to perform a query (or pre-audit) against the audit. The owner of the audit may also perform a query against his or her own audit based on the form data.

Figure 5:
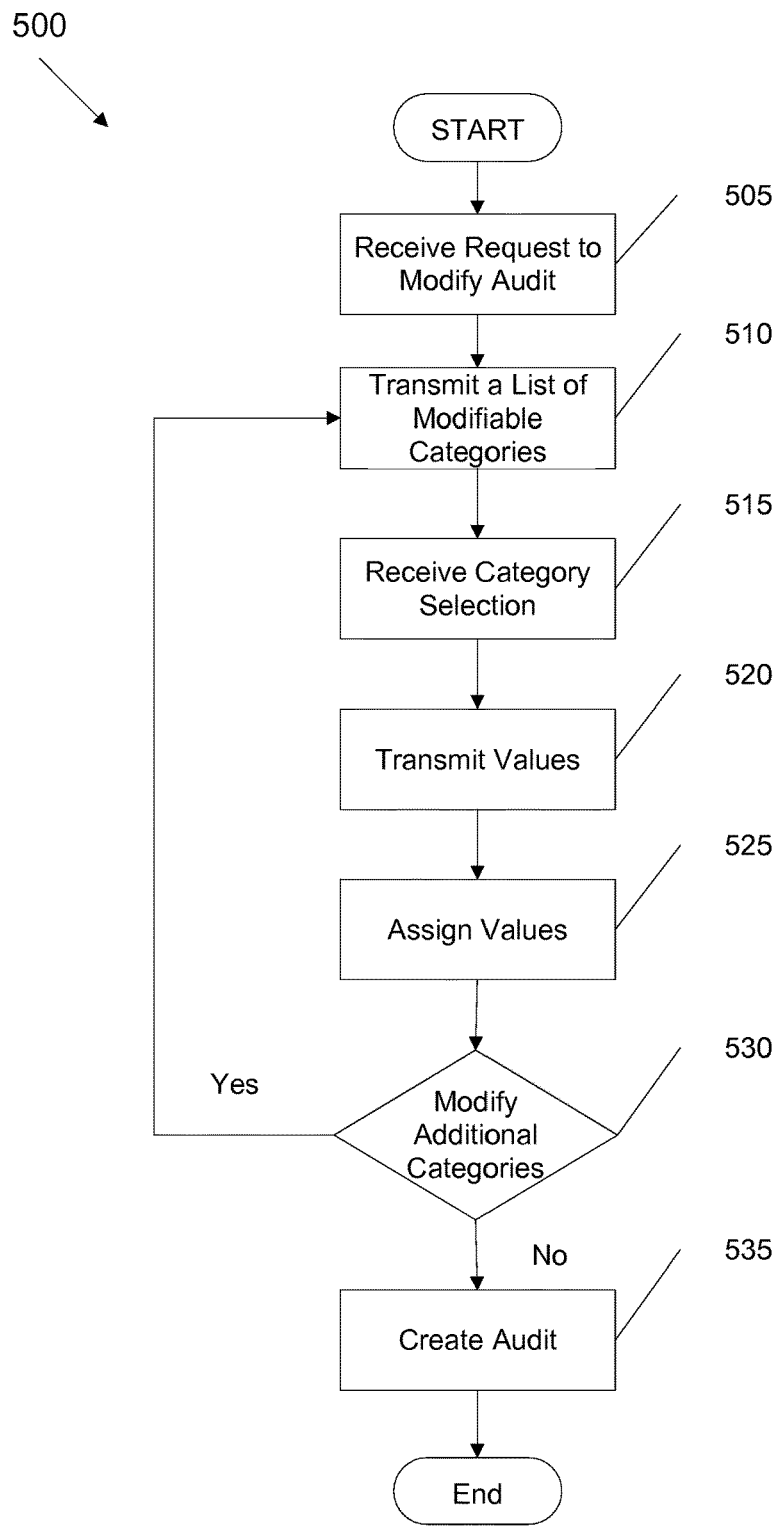
FIG. 5 is a flowchart illustrating a method for modifying the audit after creation, according to an embodiment of the present invention.

FIG. 5 is a flowchart illustrating a method 500 for modifying the audit after creation, according to an embodiment of the present invention. In some embodiments, method 500 of FIG. 5 may be implemented, for example, by computing system 100 of FIG. 1. The method includes receiving a request to modify a created audit from an owner of the audit at 505. In response to the request, the computing system transmits a list of categories to be modified at 510. At 515, the computing system receives a selected category to be modified, and transmits values that may be assigned to the category at 520. At 525, the computing system receives the values and assigns the new values to the selected category.

At 530, the computing system determines whether additional categories are to be modified based on a response from the owner of the audit. If the computing system determines that additional categories are not to be modified, then the computing system updates the audit at 535. If the computing system determines that additional categories are to be modified, then the computing system returns to 510 and transmits a list of categories that can be modified.

Embodiments of the present invention also allow the owner of the audit to grant access to his or her audit to other parties, also known as a pre-audit. The commercial purpose is described more fully in related U.S. patent application Ser. No. 13/400,872. Generally, the pre-audit mechanism allows the supplier to know what the purchaser's disposition is regarding the form data in advance of selling the form data to the purchaser. For example, the disposition and actions may include accept or reject, or include the dollar amount the purchaser is willing to pay for the form data. In such a case, the supplier may query (or pre-audit) the audit of the owner in order to view some or all of the information that the owner would receive when querying its own audit.

In some embodiments, the owner of the commercial service may wish to limit the information that the purchaser receives back from the service. In this case, the system may provide functionality to the owner of the audit to limit, or grant full access to, the total information set that is to be returned to the purchaser. For example, the owner of the audit may allow a supplier to query its audit, but only provide the supplier with a composite score or an overall score defined in the audit for the composite score. In another example, the purchaser could query against the audit and only receive a number or dollar amount, as compared with receiving back all of the information. In another embodiment, a purchaser may return a rule set to a supplier, as well. For example, the purchase may return a rule set containing a definition of the audit to the supplier.

Figure 6:
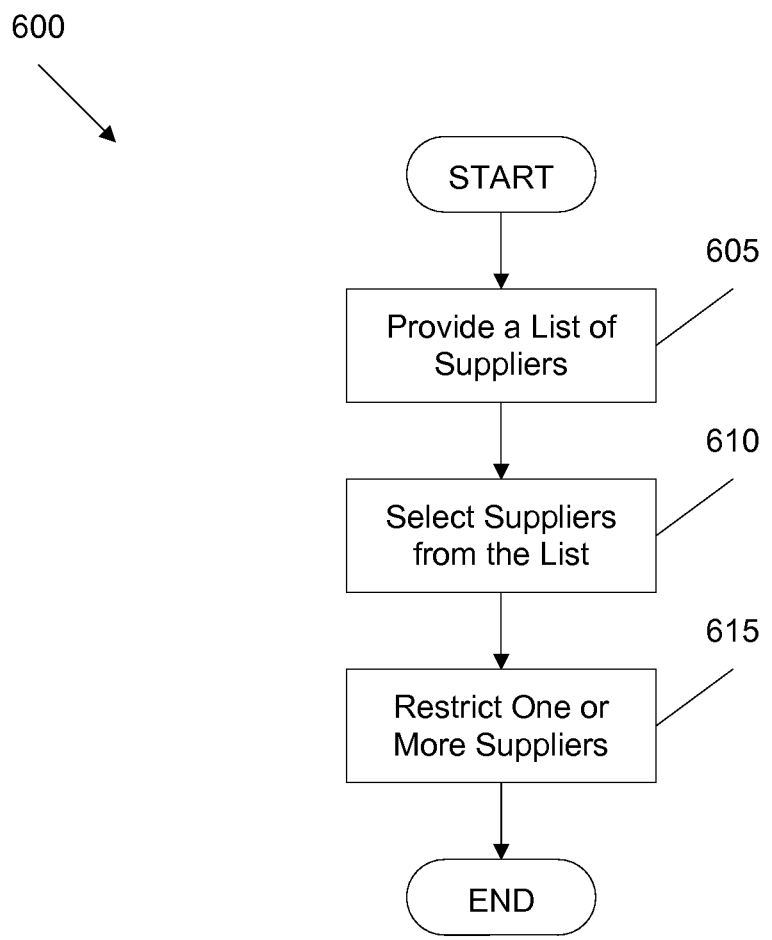
FIG. 6 is a flowchart illustrating a method for authorizing one or more suppliers of form data to perform a query against an audit, according to an embodiment of the present invention.

FIG. 6 is a flowchart illustrating a method 600 for authorizing one or more suppliers of form data to perform a query against an audit, according to an embodiment of the present invention. In some embodiments, method 600 of FIG. 6 may be implemented, for example, by computing system 100 of FIG. 1.

At 605, the computing system provides a list of form data suppliers to the owner of the audit. At 610, based on the list, the owner can select from the list the form data suppliers that can query the audit that was created by the owner. The owner may select individual suppliers, a group of suppliers, all suppliers, etc. At 615, based on the selection, the computing system may restrict one or more suppliers from performing a query of the form data against the audit. This feature may also allow the owner of the audit to customize the audit to return limited amounts of information back to the supplier performing the query.

Figure 7:
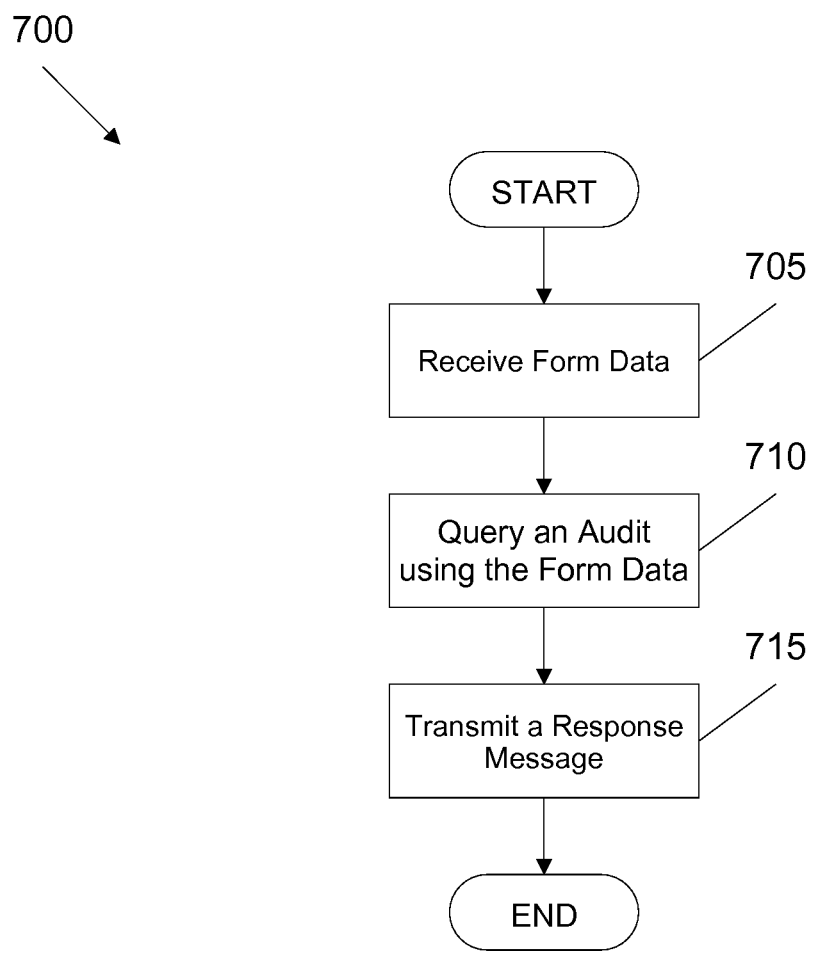
FIG. 7 is a flowchart illustrating a method for querying an audit created by the owner, according to an embodiment of the present invention.

FIG. 7 is a flowchart illustrating a method 700 for querying an audit created by the owner, according to an embodiment of the present invention. In some embodiments, method 700 of FIG. 7 may be implemented, for example, by computing system 100 of FIG. 1. This embodiment allows one or more suppliers of the form data to perform a query (or pre-audit) against the audit.

At 705, the computing system receives form data from a supplier prior to the form data being delivered to a purchaser (or client). At 710, the server queries an audit using the form data. For example, the computing system compares the form data with values set in the audit. At 715, the server transmits a response message to the supplier. The response message may include one or more results and one or more descriptions related to the one or more results. In other words, the one or more descriptions pertain to what the purchaser thinks of the form data without the purchaser actually viewing the form data.

FIG. 8 is a flowchart illustrating a method 800 for querying an audit created by the owner, according to an embodiment of the present invention. In some embodiments, method 800 of FIG. 8 may be implemented, for example, by computing system 100 of FIG. 1. This embodiment allows one or more authorized suppliers of the form data to perform a query (or pre-audit) against the audit.

At 805, the computing system receives form data from a supplier, and the server determines whether the owner of the audit has given permission to the supplier of the form data at 810. If the supplier does not have permission, then the computing system transmits an access denied message. In another embodiment, the computing system may allow the supplier to conduct a limited query of the audit when lacking permission.

If the supplier has permission to perform a query against the owner's audit, then the computing system compares at 815 the form data with values assigned for each condition in the audit. Based on the comparison, the server at 820 transmits a response message to the supplier indicating which owner (purchaser) is interested in or will purchase the form data. In other embodiments, depending on the configuration of the audit, the response message may include limited information to the supplier.

It should be appreciated that in certain embodiments, the owner of the audit may also perform a query against his or her own audit based on the form data. For example, an owner of an audit may query against his or her own audit on an automated basis or using a user interface. In other embodiments, once the owner has purchased the form data, the owner may want to verify whether the purchased form data is valid or contains up-to-date information. FIG. 9 is a flowchart illustrating a method 900 for performing a query against an audit, according to an embodiment of the present invention. In some embodiments, method 900 of FIG. 9 may be implemented, for example, by computing system 100 of FIG. 1.

The method includes receiving at the computing system form data from the owner of the audit at 905. The form data allows the computing system to retrieve data associated with the form data based on the FIN associated with the form data at 910. The computing system compares the form data against the audit created by the owner at 915. For example, data associated with the form data is compared against each deposition and each category associated with the audit. At 920, a result for each disposition is transmitted to the user based on the comparison.

The result may include a flag disposition for each disposition. For example, if the owner assigned a yellow flag to form data age that is 1 to 2 days old, then a yellow flag would be returned to the user under the category defined as "lead age." For instance, in the above example, the querying party may receive back a result indicating "1-2 days old," a category number, or a letter corresponding to "1-2 days old."

An overall flag result, which may be a combination of all flag results built into a composite flag and/or the lowest ranking flag across all dispositions, may also be returned to the user. For instance, using the same example, if all categories returned green flags except for "lead age," which returned a yellow flag, then the overall flag result may be yellow because the yellow flag is the lowest returned flag (assuming the order from highest to lowest is green, yellow and red).

In certain embodiments, a numeric value may also be returned for the query. Using the above example, when form data age is 1 to 2 days and a yellow flag is returned, a numeric value of −4 may also be transmitted to the owner, depending on the configuration of the audit. However, in the case where the form data age is 12 to 24 hours old and a yellow flag is returned, a numeric value of −2 may be transmitted to the user.

In other embodiments, the computing system may return a composite numeric score in response to the query. The composite score may be the sum of all numbers for each disposition. For example, if the form data age score is at −4, the form data velocity score is at +3, and every other disposition score is at 0, the composite score for the query against the audit would be −1.

An action in response to the query may also be returned in some embodiments. The action may be a predefined action for the overall result flag, and the overall pre-defined action for the composite score. The action may identify whether the lead is a good lead or bad lead.

The method steps shown in FIGS. 3-9 may be performed, in part, by a computer program, encoding instructions for a nonlinear adaptive processor to cause at least the methods described in FIGS. 3-9 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 3-9, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Embodiments of the present invention pertain to creating an audit that includes flags, scores, or other suitable indicators for each disposition associated with form data. In such embodiments, values may be assigned to each disposition category. The values may include flags, scores, and/or actions that may be returned to the querying party when a query is performed against the audit.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
authorizing, by a computing system, a client device of a lead purchaser to create an audit for lead data, wherein the audit comprises a list of customizable categories for a lead;
receiving, by the computing system, from the client device one or more categories selected to have customized rules;
transmitting, by the computing system, to the client device one or more rules associated with the one or more categories;
receiving, at the computing system, from the client device, one or more values that are to be assigned to the one or more categories;
assigning, by the computing system, the one or more values for a disposition within the one or more categories to allow a query to be performed by a lead supplier against the audit created by the lead purchaser using a lead identification number associated with the lead data; and
querying, by the computing system, the audit created by the lead purchaser, wherein
the querying of the audit further comprises
evaluating one or more dispositions in real-time without disclosing the lead data to the lead purchaser and identifying the lead purchaser interested in purchasing the lead data prior to transmission of the lead data to the lead purchaser, wherein the evaluating one or more dispositions in real-time further comprises
comparing lead data supplied by a lead supplier against the one or more values within the created audit, and
returning a result indicating the lead purchaser's interest for the lead data according to the comparison.

2. The computer-implemented method of claim 1, wherein the one or more values comprise at least one of flags, a score range, and an overall score.

3. The computer-implemented method of claim 1, wherein the assigning of the one or more values to each disposition comprises assigning one or more default values to each disposition.

4. The computer-implemented method of claim 1, wherein the assigning of the one or more values to each disposition comprises assigning one or more user-customized values to each disposition.

5. The computer-implemented method of claim 1, further comprising:
receiving, at the computing device, a request to assign one or more user-customized values to each disposition prior to, or after, creating the audit.

6. The computer-implemented method of claim 5, further comprising:
receiving, at the computing device, the one or more user-customized values prior to, or after, creating the audit.

7. The computer-implemented method of claim 6, further comprising:
assigning, at the computing device, the one or more user-customized values prior to, or after, creating the audit.

8. An apparatus, comprising:
at least one processor; and
memory comprising a computer program,
wherein the computer program, when executed by the at least one processor, is configured to cause the apparatus to:
authorize a client device of a lead purchaser to create an audit for lead data, wherein the audit comprises a list of customizable categories for a lead,
receive from the client device one or more categories selected to have customized rules;
transmit to the client device one or more rules associated with the one or more categories;
receive one or more values, from the client device, for a disposition within the one or more categories;
assign the one or more values for a disposition to allow a query to be performed by a lead supplier against the audit created by the lead purchaser using a lead identification number associated with the lead data; and
query the audit created by the lead purchaser, wherein
wherein the query comprises evaluation of one or more dispositions in real-time without disclosing the lead data to the lead purchaser and identify the lead purchaser interested in purchasing the lead data prior to transmitting the lead data to the lead purchaser, wherein the evaluation of the one or more dispositions in real-time further comprises
compare lead data supplied by a lead supplier against the one or more values within the created audit, and
return a result indicating the lead purchaser's interest for the lead data according to the comparison.

9. The apparatus of claim 8, wherein the one or more values comprise at least one of flags, a score range, and an overall score.

10. The apparatus of claim 8, wherein the computer program, when executed by the at least one processor, is further configured to cause the apparatus to assign one or more default values to each disposition.

11. The apparatus of claim 8, wherein the computer program, when executed by the at least one processor, is further configured to cause the apparatus to assign one or more user-customized values to each disposition.

12. The apparatus of claim 8, wherein the computer program, when executed by the at least one processor, is further configured to cause the apparatus to receive a request to assign one or more user-customize values to each disposition prior to, or after, creating the audit.

13. The apparatus of claim 12, wherein the computer program, when executed by the at least one processor, is further configured to cause the apparatus to receive the one or more user-customized values prior to, or after, creating the audit.

14. The apparatus of claim 13, wherein the computer program, when executed by the at least one processor, is further configured to cause the apparatus to assign the one or more user-customized values prior to, or after, creating the audit.

* * * * *